United States Patent
Ci (10) Patent No.: US 10,595,547 B2
(45) Date of Patent: Mar. 24, 2020

(54) SOLID DRINK FOR REGULATING QI-DEPRESSION CONSTITUTION AND PROCESSING METHOD THEREOF

(71) Applicant: Zhonghua Ci, Beijing (CN)

(72) Inventor: Zhonghua Ci, Beijing (CN)

( * ) Notice: Subject to any disclaimer, the term of this patent is extended or adjusted under 35 U.S.C. 154(b) by 134 days.

(21) Appl. No.: 15/874,313

(22) Filed: Jan. 18, 2018

(65) Prior Publication Data

US 2019/0159483 A1 May 30, 2019

(30) Foreign Application Priority Data

Nov. 30, 2017 (CN) .......................... 2017 1 1240352

(51) Int. Cl.
| | |
|---|---|
| *A23L 2/38* | (2006.01) |
| *A23L 33/105* | (2016.01) |
| *A23L 33/18* | (2016.01) |
| *A23L 2/39* | (2006.01) |
| *A23L 2/06* | (2006.01) |

(52) U.S. Cl.
CPC ............... *A23L 2/38* (2013.01); *A23L 2/06* (2013.01); *A23L 2/39* (2013.01); *A23L 33/105* (2016.08); *A23L 33/18* (2016.08); *A23V 2002/00* (2013.01); *A23V 2200/322* (2013.01); *A23V 2250/2131* (2013.01); *A23V 2250/2482* (2013.01); *A23V 2250/5114* (2013.01); *A23V 2250/5118* (2013.01); *A23V 2300/31* (2013.01); *A23V 2300/50* (2013.01)

(58) Field of Classification Search
CPC .......... A23L 2/38; A23L 33/18; A23L 33/105; A23L 2/06; A23L 2/39; A23V 2002/00

USPC ................ 426/590, 598, 615, 518, 520, 648
See application file for complete search history.

(56) References Cited

U.S. PATENT DOCUMENTS

| 7,258,877 B2 * | 8/2007 | Shen et al. |
| 2009/0275531 A1 * | 11/2009 | Muller et al. |
| 2014/0234488 A1 * | 8/2014 | Chang et al. |
| 2014/0242063 A1 * | 8/2014 | Duffield et al. |

FOREIGN PATENT DOCUMENTS

| CN | 106581593 A | * | 4/2017 |
| DE | 202004018534 | * | 4/2005 |

* cited by examiner

*Primary Examiner* — Helen F Heggestad
(74) *Attorney, Agent, or Firm* — Cantor Colburn LLP (57) ABSTRACT

The present application discloses a solid drink for regulating qi-depression constitution. The solid drink comprises the following components of raw materials in parts by weight: citron 20-44 parts, *perilla* 17-45 parts, finger citron 10-38 parts, *citrus aurantium* L. 9-35 parts, sword bean 10-33 parts, mint 20-50 parts, spina data seeds 18-50 parts, malt 24-43 parts, dried orange peel 11-32 parts, Chinese olive 17-45 parts, *sterculia lychnophora* 8-23 parts, dextrin 25-55 parts, maltodextrin 15-45 parts, soluble starch 15-45 parts, and aspartame 0.1-0.3 parts. The solid drink of the present invention is easy to manufacture, and all the raw materials used are medicine materials of medicinal and edible dual purposes, and all the excipients used also satisfy national standard GB2760-2011 (National Food Safety Standard for Uses of Food Additives). It is safe to eat (drink) and has good taste, with certain effects in improving the qi-depression constitution. Moreover, the processing process is suitable for industrial mass production.

10 Claims, 2 Drawing Sheets

SOLID DRINK FOR REGULATING QI-DEPRESSION CONSTITUTION AND PROCESSING METHOD THEREOF

TECHNICAL FIELD

The present invention relates to the field of health food, and particularly to a solid drink for regulating qi-depression constitution and a processing method thereof.

BACKGROUND

According to "Classification and Determination of Constitution in TCM" by China Association of Chinese Medicine, the constitution of human bodies includes nine types, namely, balanced constitution (constitution of yin-yang harmony), qi-depression constitution, yin-deficiency constitution, qi (vital energy)-deficiency constitution, qi-depression (tanshi) constitution, dampness-heat constitution, qi-depression constitution, blood-stasis constitution, and allergic (special, tebing) constitution. Most of them belong to sub-health status.

The qi-depression constitution is a constitution state formed due to long-term poor emotion, qi-movement stagnation, with the main manifestation of introverted and unstable personality, depression and fragility, and being sensitive and suspicious. Such constitution state is common in young and middle-aged, female predominated, mostly being solitary and introverted in personality, prone to be sentimental, and narrow minded. The diseases of people with the di-depression constitution mainly come on the liver, together with the heart, stomach, large intestine, and small intestine. It will easily result in damages to the emotion and diet, unsmooth qi-movement, such as depression disease, insomnia, globus hysteriocus, and panic. It is found in modern researches that such constitution tends to develop tumors. The regulation and treatment should be regulating the emotion and dredging the qi-movement.

The qi-depression constitution, being a sub-health constitution, generally belongs to depression constitution. People with the qi-depression constitution should pay attention to mentality regulation, mind regulation, and nature cultivation in daily life, maintaining good psychological balance, and doing more physical exercises. Since the qi-depression occurs first, and stasis is the basis, dredging the qi-movement is the treatment principle. The common Chinese medicine dosage form includes decoction and Chinese patent drug such as pills. The decoction has a better efficacy, but is tedious to take, and the taste thereof is also bad. It is not easy for patients to persistently take decoction for a long period of time, while the efficacy of pills is relatively poor.

Food is the best for preventing diseases and keeping healthy for human beings. "Homology between medicine and food" is one of the most valuable contributions of original Chinese medical science to the human beings. According to "Rites of Zhou•Tianguan•Curing Sickness", curing diseases by combining five tastes, five cereals, and five medicines, which indicates the physiological health-care function of food. A method of regulating organism using properties of food to get healthy or cure diseases is called as food therapy (nutrition therapy, dietary therapy). However, "nourishment" is better than "therapy". Dietary nourishment refers to nourishing by combining nutritional effects of food with the physical condition of the body to enhance resistibility and immunity, and further to prolong life and have a strong physique. According to "Qian Jin Prescriptions", a doctor should firstly know the source of a disease and symptoms, then treat the disease with corresponding food. If the disease cannot be cured through food therapy, then a medicine is used. It can be seen that the application of food therapy is not only the basic treatment means of doctors at that time, but also an important ground for evaluating whether a doctor has excellent medical skills.

It is proposed in "Huangdi Neijing" that "making preventive treatment before getting illness is the top-class medical skill, performing treatment when illness is suspected is the middle-class medical skill, and performing treatment when illness is present is the lower-class medical skill". "Making preventive treatment before getting illness" refers to taking corresponding measures to prevent occurrence and development of illness. The constitution determines our health and susceptibility to diseases. In the face of various diseases, increasingly low morbidity age, and more and more sub-healthy population, the food therapy is favored by more and more consumers due to its advantages of being healthy and natural. With regard to problems easily arising, it is of critical significance to develop a type of food having the function of maintaining good health and regulating qi-depression constitution with good taste by combining the precious experience of traditional Chinese health care and accumulation of good aspects of keeping the balanced constitution of the traditional Chinese medicine, using technologies and methods of modern sciences, based on the homology between medicine and food.

DISCLOSURE OF THE INVENTION

A main object of the present invention is to provide a health-care food for regulating qi-depression constitution.

In order to achieve the above object, according to one aspect of the present invention, a solid drink for regulating qi-depression constitution is provided.

The solid drink for regulating qi-depression constitution according to the present invention includes the following components of raw materials in parts by weight: citron 20-44 parts, *perilla* 17-45 parts, finger citron 10-38 parts, *citrus aurantium* L. 9-35 parts, sword bean 10-33 parts, mint 20-50 parts, spina data seeds 18-50 parts, malt 24-43 parts, dried orange peel 11-32 parts, Chinese olive 17-45 parts, *sterculia lychnophora* 8-23 parts, dextrin 25-55 parts, maltodextrin 15-45 parts, soluble starch 15-45 parts, and aspartame 0.1-0.3 parts.

Furthermore, the solid drink for regulating qi-depression constitution of the present invention includes the following components of raw materials in parts by weight: citron 25-40 parts, *perilla* 20-38 parts, finger citron 13-33 parts, *citrus aurantium* L. 12-30 parts, sword bean 15-25 parts, mint 25-43 parts, spina data seeds 23-44 parts, malt 28-39 parts, dried orange peel 14-26 parts, Chinese olive 23-41 parts, *sterculia lychnophora* 10-18 parts, dextrin 30-50 parts, maltodextrin 20-40 parts, soluble starch 20-40 parts, and aspartame 0.15-0.25 parts.

Furthermore, the solid drink for regulating qi-depression constitution of the present invention includes the following components of raw materials in parts by weight: citron 33 parts, *perilla* 33 parts, finger citron 20 parts, *citrus aurantium* L. 20 parts, sword bean 20 parts, mint 33 parts, spina data seeds 33 parts, malt 33 parts, dried orange peel 20 parts, Chinese olive 33 parts, *sterculia lychnophora* 13 parts, dextrin 40 parts, maltodextrin 30 parts, soluble starch 30 parts, and aspartame 0.2 parts.

In order to achieve the above object, according to another aspect of the present invention, a method for processing a solid drink for regulating qi-depression constitution is provided.

The method for processing a solid drink for regulating qi-depression constitution according to the present invention includes the following steps:

(1) preparing raw materials: mixing citron, *perilla*, mint, spina data seeds, malt, Chinese olive, finger citron, *citrus aurantium* L., sword bean, dried orange peel, and *sterculia lychnophora* having undergone purification, cleansing, cutting, and grinding, for subsequent use;

(2) decocting: decocting twice a mixture obtained in step (1) with addition of water, to obtain a Chinese medicine liquid;

(3) concentrating: feeding the Chinese medicine liquid obtained in step (2) into a concentrator via a pipeline, to be concentrated into a thick paste;

(4) wet granulating: mixing and stirring dextrin, maltodextrin, soluble starch, and aspartame to obtain a mixed excipient, and adding the thick paste obtained in step (3) to the mixed excipient, then stirring and granulating them.

Furthermore, operations of the twice decocting processes in the above step (2) are as follows:

for the first time, adding water of 10 times the weight of the mixture obtained in the above step (1), heating them for decocting and extracting the same, wherein timing is started when they are boiling, and after 1.5 hours of decoction and extraction, immediately feeding a medicine liquid through a pipeline filter by a pump into a stainless steel medicine liquid tank;

for the second time, adding water of 8 times the weight of the mixture obtained in the above step (1), heating them for decocting and extracting the same, wherein timing is started when they are boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction.

Furthermore, the concentration temperature in the above step (3) is 70-80° C., and the relative density of the resulted thick paste is 1.2-1.5 under a temperature condition of 50° C.

Furthermore, the wet granulating in the above step (4) includes the following steps:

(4.1) dry blending: putting dextrin, maltodextrin, soluble starch, and aspartame into an efficient mixing granulator to be mixed and stirred for 15 minutes, to obtain the mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time;

(4.3) drying: putting the sized particles obtained in step (4.2) into a boiling dryer to be dried;

(4.4) sizing for the second time: performing the second time of sizing by an oscillating machine.

Furthermore, a 12-mesh screen is used in the first time of sizing, and a 10-mesh screen is used in the second time of sizing.

Furthermore, in the drying process of step (4.3), a temperature of the materials is kept at 70-80° C., and a moisture of the final materials is kept below 5%.

Furthermore, a step of selecting particles is further included after the second time of sizing, to select particles with 10-60 meshes.

The solid drink of the present invention is easy to manufacture, and all the raw materials used are medicine materials of medicinal and edible dual purposes, and all the excipients used also satisfy national standard GB2760-2011 (National Food Safety Standard for Uses of Food Additives). It is safe to eat (drink) with good taste, and has certain effects on improving the qi-depression constitution. Moreover, the processing process is suitable for industrial mass production.

BRIEF DESCRIPTION OF DRAWINGS

The figures constituting a portion of the present application are used for further understanding of the present invention, so as to make it more obvious other features, objects, and advantages of the present application. Exemplary examples of the present application, drawings, and description thereof are used to explain the present invention, rather than improperly limiting the present invention. In the figures.

DETAILED DESCRIPTION OF EMBODIMENTS

In order to make a person skilled in the art better understand solutions of the present application, below technical solutions of the examples of the present application will be described clearly and completely in conjunction with figures of the examples of the present application. Apparently, some but not all of examples of the present application are described. Based on the examples of the present application, all the other examples, which a person ordinarily skilled in the art obtains without paying inventive effort, fall within the scope of protection of the present application.

Besides, the term "include (comprise)" and any variants thereof are intended to cover non-exclusive containing, for example, a product including a series of raw materials or a method including a series of steps is not necessarily limited to listing those raw materials or steps, but may include other steps or raw materials which are not clearly listed or inherent to the method or product.

It should be indicated that examples of the present application and features in the examples can be combined with each other without conflict. The present application will be described in detail with reference to the figures in conjunction with the examples.

A main object of the present invention is to provide a health-care food for regulating qi-depression constitution.

In order to realize the above object, according to one aspect of the present invention, a solid drink for regulating qi-depression constitution is provided.

The solid drink for regulating qi-depression constitution according to the present invention includes the following components of raw materials in parts by weight: citron 20-44 parts, *perilla* 17-45 parts, finger citron 10-38 parts, *citrus aurantium* L. 9-35 parts, sword bean 10-33 parts, mint 20-50 parts, spina data seeds 18-50 parts, malt 24-43 parts, dried orange peel 11-32 parts, Chinese olive 17-45 parts, *sterculia lychnophora* 8-23 parts, dextrin 25-55 parts, maltodextrin 15-45 parts, soluble starch 15-45 parts, and aspartame 0.1-0.3 parts.

Citron: citron, acrid, bitter, and sour in taste and warm in nature, exerts the curative effect through the liver, spleen, and lung channels, soothes the liver and regulates qi, regulates the middle energizer, and eliminates phlegm, and is used for treatment of qi-stagnation in the liver and stomach, distending pain in chest and hypochondrium, abdominal distention and fullness, vomiting and eructation, excessive phlegm and cough.

Perilla: perilla, acrid in taste and warm in nature, exerts the curative effect through the lung and spleen channels, relieves exterior syndrome by diaphoresis, promotes the circulation of qi and harmonizes stomach, and is used for treatment of common cold due to wind-cold, cough and nausea in the abdomen, pregnancy vomiting, and fish and crab poisoning.

Finger citron: finger citron, acrid, bitter, and sour in taste and warm in nature, exerts the curative effect through the liver, spleen, stomach, and lung channels, has the efficacy of soothing the liver and regulating qi, harmonizing the stomach to relieve pain, eliminating dampness and phlegm, and is used for treatment of qi-stagnation in the liver and stomach, distending pain in chest and hypochondrium, stomach distention and fullness, reduced appetite and vomiting, and cough and excessive phlegm.

Citrus aurantium L.: citrus aurantium L., sweet and slightly bitter in taste and mild in nature, promotes the circulation of qi to regulate the middle energizer, promotes the digestion, and eliminates the phlegm, and is used for treatment of depression and distending pain in chest and abdomen, indigestion, phlegm-fluid retention, rectocele, liver soothing, stomach harmonizing, qi regulation, stuffiness distress in the chest, abdominal distention, vomiting, and reduced appetite.

Sword bean: sword bean, sweet in taste and warm in nature, exerts the curative effect through the stomach and kidney channels, warms the middle energizer, descends qi, relieves hiccup, and is used for treatment of deficiency-cold hiccup and vomiting.

Mint: mint, acrid in taste and cold in nature, exerts the curative effect through the lung and liver channels, dispels wind and heat, clears and disinhibits the head and eyes, relieves sore throat and promotes eruption, soothes the liver, and promotes the circulation of qi, and is used for the treatment of common cold due to wind-heat, headache, swollen sore throat, dyspepsia and flatulence, aphtha, toothache, furuncle, urticarial, beginning of warm diseases, rubella pruritus, liver depression and qi stagnation, chest distress and hypochondriac pain.

Spina data seed: spina data seed, sweet and sour in taste and mild in nature, exerts the curative effect through the heart, spleen, liver, and gallbladder channels, nourishes the liver, calms the heart, soothes the nerves, arrests sweating, and is used for the treatment of dysphoria insomnia, palpitation, body deficiency and spontaneous perspiration, and night sweating.

Malt: malt, sweet in taste and mild in nature, exerts the curative effect through the spleen and stomach channels, promotes the circulation of qi and digestion, tonifies the spleens, stimulates appetite, terminates lactation, and relieves flatulence, and is used for treatment of indigestion, abdominal distention, reduced spleen-deficiency appetite, milk stasis, breast tenderness, delectation of women, liver depression and hypochondriac pain, and stomachache due to emotional depression and the hyperactive liver-qi attacking the stomach.

Dried orange peel: dried orange peel, acrid and slightly bitter in taste and warm in nature, exerts the curative effect through the spleen and lung channels, has the efficacy of regulating qi and middle energizer, removing dampness to reduce phlegm, and can be used for treatment of qi stagnation of spleen and stomach, abdominal fullness and distention, vomiting, or chest distress, anorexia, and loose stool caused by retention of damp-turbid substance, but should be used with caution for people with yin and body fluid deficiency and excessive heat inside.

Chinese olive: Chinese olive, sweet and sour in taste and mild in nature, exerts the curative effect through the lung and stomach channels, clears away heat and toxic materials, relieves sore throat, generates the body fluid, and is used for treatment of swollen sore throat, cough and sticky phlegm, vexation heat and thirst, and fish and crab poisoning.

Sterculia lychnophora: sterculia lychnophora, sweet in taste and cold in nature, exerts the curative effect through the lung and large intestine channels, clears away heat and moistens the lung, relieves sore throat and eases up the voice, relaxes bowel, and is used for treatment of lung heat and celostomia, dry cough without phlegm, sore dry throat, heat accumulation constipation, headache and hot eyes.

People with the qi-depression constitution are mostly physically emaciated or slightly overweight, pale and dark or chlorotic in complexion, usually quick-tempered and irritable, emotional, or melancholy, distressed in chest and uncomfortable, with frequent signing, reddish tongue, white tongue fur, and stringy pulse. The attacked will have distending pain in chest and hypochondrium or scurrying; or breast and underbelly swelling pain, irregular menstruation, dysmenorrhea; or obstruction in throat as if there are foreign matters; or gall in neck; or stomach distention swelling pain, acid dip spitting, hiccup eructation; or abdominal pain borborygmus, discomforting evacuation; or qi ascending counterflow, headache dizziness, sudden faint and haematemesis. The qi depression occurs first, and stasis is the basis, therefore, dredging the qi movement is the principle for recuperating people with the qi-depression constitution. In the prescription, citron soothes the liver and regulates qi, perilla promotes the circulation of qi and harmonizes stomach, the dried orange peel regulates qi and middle energizer, malt promotes the circulation of qi and digestion, together serving the effect of soothing the qi movement. Finger citron soothes the liver and regulates qi; citrus aurantium L. harmonizes the stomach and regulates qi; sword bean warms the middle energizer and descends qi; mint soothes the liver and promotes the circulation of qi. Spina data seed calms the heart and soothes the nerves; Chinese olive clears away toxic materials and generates the body fluid; Sterculia lychnophora clears away heat and moistens the lung. In the present invention, citron, perilla, dried orange peel, and malt are main (monarch) drugs, finger citron, citrus aurantium L., sword bean, and mint are adjuvant (minister) drugs, and spina data seed, Chinese olive, and sterculia lychnophora are conductant (envoy) drugs, in addition, dextrin, maltodextrin and aspartame, on one hand, can exert the medicinal value and balance the nutritional ingredients, and on the other hand, also can be used for seasoning.

Figure 1:
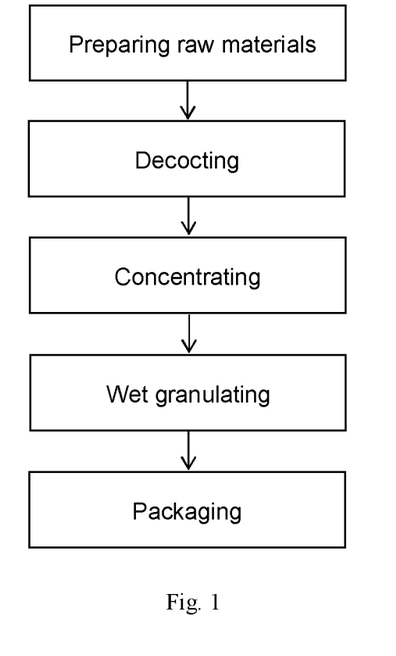
FIG. 1 shows a processing process of a solid drink according to an example of the present invention.

As shown in FIG. 1, a method for processing a solid drink for regulating qi-depression constitution includes the following steps:

(1) preparing raw materials: mixing citron, perilla, mint, spina data seeds, malt, Chinese olive, finger citron, citrus aurantium L., sword bean, dried orange peel, and sterculia lychnophora having undergone purification, cleansing, cutting, and grinding, for subsequent use, with proportions of respective raw materials being the proportions provided in the present invention;

(2) decocting: decocting twice a mixture obtained in step (1) with addition of water, to obtain a Chinese medicine liquid;

(3) concentrating: feeding the Chinese medicine liquid obtained in step (2) into a concentrator via a pipeline, to be concentrated into a thick paste;

(4) wet granulating: mixing and stirring dextrin, maltodextrin, soluble starch, and aspartame to obtain a mixed excipient, and adding the thick paste obtained in step (3) to the mixed excipient, then stirring and granulating them;

(5) packaging: subjecting a product obtained after the wet granulating to a packaging step, to result in a finished product.

The object of step (1) is to remove fat from the seed Chinese medicine materials ground with a 2-mesh screen; cutting or grinding rhizomatic Chinese medicine materials, enriched in cellulose and starch, to be extracted can effectively reserve target ingredients and prevent expansion of polysaccharides; purification can remove impurities and soil, and effectively reduce remnant of pollutants such as heavy metals and pesticides.

Operations of the twice decocting processes in the above step (2) are as follows: for the first time, adding water of 10 times the weight of the mixture obtained in the step (1), heating them for decocting and extracting the same, wherein timing is started when they are boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing is started when they are boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction.

The concentration temperature in the above step (3) is 70-80° C., and the relative density of the resulted thick paste is 1.2-1.5 under the temperature condition of 50° C. Low-temperature evaporation can effectively reduce decomposition of heat-sensitive components, for example, organic acids such as citric acid, malic acid, and oxalic acid, moreover, it has high concentration efficiency with no discharge of solvent vapor, and facilitates evaporation and airtightness without polluting environment.

Figure 2:
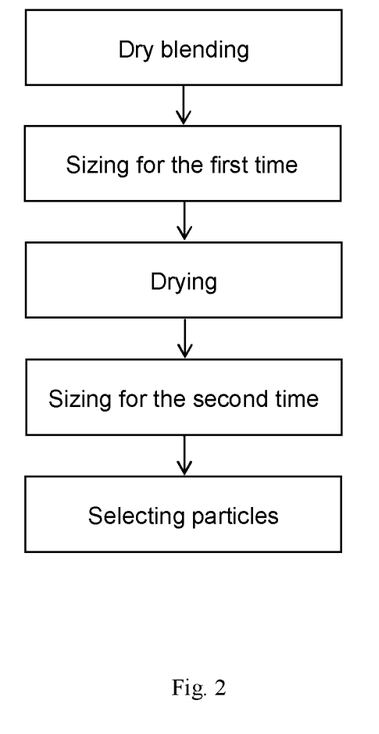
FIG. 2 shows specific steps of wet granulating in a processing process of a solid drink according to an example of the present invention.

As shown in FIG. 2, the wet granulating in the above step (4) includes the following steps:

(4.1) dry blending: putting dextrin, maltodextrin, soluble starch, and aspartame into an efficient mixing granulator to be mixed and stirred for 15 minutes, to obtain the mixed excipient, with proportions of respective raw materials being the proportions provided in the present invention;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time, wherein mixing granulation can preferably prevent separation of various components, and since the segregation phenomenon easily occurs due to differences existing among particle sizes and densities of the components of the mixed extract, the granulation not only can overcome this problem, but also can significantly improve the solubility;

(4.3) drying: putting the sized particles obtained in step (4.2) into a boiling dryer to be dried, wherein the boiling dryer can effectively control the particle size distribution, and control the moisture of the product;

(4.4) sizing for the second time: performing the second time of sizing by an oscillating machine, wherein through the second time of sizing, the particles distribution, bulk density, and compactness can be controlled.

In the above steps, a 12-mesh screen is used in the first time of sizing, and a 10-mesh screen is used in the second time of sizing.

In the drying process of the above step (4.3), the temperature of the materials is kept at 70-80° C., and the moisture of the final materials is kept below 5%. In the present step, a pot can be turned frequently according to the drying situation of the materials, ensuring that the moisture of the final materials meets requirements.

On the basis of the above embodiment, a step of selecting particles is further included after the second time of sizing, to select particles with 10-60 meshes. The appearance and homogeneity of the product particles can be improved by selecting the particles. In practical operation, after the particle selection, a product name, a product lot number, specification, net weight, date of manufacture, name of position, and person in charge are recorded and tagged, and a delivery receipt is filled in, then the product is transferred to an intermediate station.

EXAMPLE 1

A solid drink for regulating qi-depression constitution included the following components of raw materials in parts by weight: citron 20 parts, *perilla* 17 parts, finger citron 10 parts, *citrus aurantium* L. 9 parts, sword bean 10 parts, mint 20 parts, spina data seeds 18 parts, malt 24 parts, dried orange peel 11 parts, Chinese olive 17 parts, *sterculia lychnophora* 8 parts, dextrin 25 parts, maltodextrin 15 parts, soluble starch 15 parts, and aspartame 0.1 part.

A preparing method was as follows:

(1) preparing raw materials: mixing citron, *perilla*, mint, spina data seeds, malt, Chinese olive, finger citron, *citrus aurantium* L., sword bean, dried orange peel, and *sterculia lychnophora*, with the above proportions, having undergone purification, cleansing, cutting, and grinding, for subsequent use;

(2) decocting: decocting twice a mixture obtained in step (1) with addition of water, to obtain a Chinese medicine liquid, operations of the twice decocting processes being as follows:

for the first time, adding water of 10 times the weight of the mixture obtained in the step (1), heating them for decocting and extracting the same, wherein timing was started when they were boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing was started when they were boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction;

(3) concentrating: feeding the Chinese medicine liquid obtained in step (2) into a concentrator via a pipeline, to be concentrated into a thick paste, the concentration temperature being 70° C., and the relative density of the resulted thick paste being 1.2 under the temperature condition of 50° C.;

(4) wet granulating:

(4.1) dry blending: putting dextrin, maltodextrin, soluble starch, and aspartame into an efficient mixing granulator to be mixed and stirred for 15 minutes, to obtain a mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time with a 12-mesh screen;

(4.3) drying: putting the sized particles obtained in step (4.2) into a boiling dryer to be dried, the temperature of the materials being kept at 70° C., and the moisture of the final materials being kept at 5%;

(4.4) sizing for the second time: performing the second time of sizing by an oscillating machine with a 10-mesh screen;

(4.5) selecting particles: selecting particles with 10-60 meshes;

(5) packaging: bagging mixed qualified particles according to standard operation instructions of an automatic packaging machine, wherein packaging appearance and quantity was detected at any time, and adjustment was made in time in case of abnormalities, closing and storing the packaged particles in a clean container, with a product name, a lot number, quantity, date, etc. being marked for subsequent use, wherein a reference packaging quantity was 8 g per bag, and a packaging quantity limit was 8 g per bag ±5%.

EXAMPLE 2

A solid drink for regulating qi-depression constitution included the following components of raw materials in parts by weight: citron 44 parts, *perilla* 45 parts, finger citron 38 parts, *citrus aurantium* L. 35 parts, sword bean 33 parts, mint 50 parts, spina data seeds 50 parts, malt 43 parts, dried orange peel 32 parts, Chinese olive 45 parts, *sterculia lychnophora* 23 parts, dextrin 55 parts, maltodextrin 45 parts, soluble starch 45 parts, and aspartame 0.3 parts.

A preparing method was as follows:

(1) preparing raw materials: mixing citron, *perilla*, mint, spina data seeds, malt, Chinese olive, finger citron, *citrus aurantium* L., sword bean, dried orange peel, and *sterculia lychnophora*, with the above proportions, having undergone purification, cleansing, cutting, and grinding, for subsequent use;

(2) decocting: decocting twice a mixture obtained in step (1) with addition of water, to obtain a Chinese medicine liquid, operations of the twice decocting processes being as follows:

for the first time, adding water of 10 times the weight of the mixture obtained in the step (1), heating them for decocting and extracting the same, wherein timing was started when they were boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing was started when they were boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction;

(3) concentrating: feeding the Chinese medicine liquid obtained in step (2) into a concentrator via a pipeline, to be concentrated into a thick paste, the concentration temperature being 80° C., and the relative density of the resulted thick paste being 1.5 under the temperature condition of 50° C.;

(4) wet granulating:

(4.1) dry blending: putting dextrin, maltodextrin, soluble starch, and aspartame into an efficient mixing granulator to be mixed and stirred for 15 minutes, to obtain a mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time with a 12-mesh screen;

(4.3) drying: putting the sized particles obtained in step (4.2) into a boiling dryer to be dried, the temperature of the materials being kept at 80° C., and the moisture of the final materials being kept at 3%;

(4.4) sizing for the second time: performing the second time of sizing by an oscillating machine with a 10-mesh screen;

(4.5) selecting particles: selecting particles with 10-60 meshes;

(5) packaging: bagging mixed qualified particles according to standard operation instructions of an automatic packaging machine, wherein packaging appearance and quantity was detected at any time, and adjustment was made in time in case of abnormalities, closing and storing the packaged particles in a clean container, with a product name, a lot number, quantity, date, etc. being marked for subsequent use, wherein a reference packaging quantity was 8 g per bag, and a packaging quantity limit was 8 g per bag ±5%.

EXAMPLE 3

A solid drink for regulating qi-depression constitution included the following components of raw materials in parts by weight: citron 25 parts, *perilla* 20 parts, finger citron 13 parts, *citrus aurantium* L. 12 parts, sword bean 15 parts, mint 25 parts, spina data seeds 23 parts, malt 28 parts, dried orange peel 14 parts, Chinese olive 23 parts, *sterculia lychnophora* 10 parts, dextrin 30 parts, maltodextrin 20 parts, soluble starch 20 parts, and aspartame 0.15 parts.

A preparing method was as follows:

(1) preparing raw materials: mixing citron, *perilla*, mint, spina data seeds, malt, Chinese olive, finger citron, *citrus aurantium* L., sword bean, dried orange peel, and *sterculia lychnophora*, with the above proportions, having undergone purification, cleansing, cutting, and grinding, for subsequent use;

(2) decocting: decocting twice a mixture obtained in step (1) with addition of water, to obtain a Chinese medicine liquid, operations of the twice decocting processes being as follows:

for the first time, adding water of 10 times the weight of the mixture obtained in the step (1), heating them for decocting and extracting the same, wherein timing was started when they were boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing was started when they were boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction;

(3) concentrating: feeding the Chinese medicine liquid obtained in step (2) into a concentrator via a pipeline, to be concentrated into a thick paste, the concentration temperature being 75° C., and the relative density of the resulted thick paste being 1.45 under the temperature condition of 50° C.;

(4) wet granulating:

(4.1) dry blending: putting dextrin, maltodextrin, soluble starch, and aspartame into an efficient mixing granulator to be mixed and stirred for 15 minutes, to obtain a mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time with a 12-mesh screen;

(4.3) drying: putting the sized particles obtained in step (4.2) into a boiling dryer to be dried, the temperature of the materials being kept at 78° C., and the moisture of the final materials being kept at 3.4%;

(4.4) sizing for the second time: performing the second time of sizing by an oscillating machine with a 10-mesh screen;

(4.5) selecting particles: selecting particles with 10-60 meshes;

(5) packaging: bagging mixed qualified particles according to standard operation instructions of an automatic packaging machine, wherein packaging appearance and quantity was detected at any time, and adjustment was made in time in case of abnormalities, closing and storing the packaged particles in a clean container, with a product name, a lot number, quantity, date, etc. being marked for subsequent use, wherein a reference packaging quantity was 8 g per bag, and a packaging quantity limit was 8 g per bag ±5%.

EXAMPLE 4

A solid drink for regulating qi-depression constitution included the following components of raw materials in parts by weight: citron 40 parts, *perilla* 38 parts, finger citron 33 parts, *citrus aurantium* L. 30 parts, sword bean 25 parts, mint 43 parts, spina data seeds 44 parts, malt 39 parts, dried orange peel 26 parts, Chinese olive 41 parts, *sterculia lychnophora* 10-18 parts, dextrin 50 parts, maltodextrin 40 parts, soluble starch 40 parts, and aspartame 0.25 parts.

A preparing method was as follows:

(1) preparing raw materials: citron, *perilla*, mint, spina data seeds, malt, Chinese olive, finger citron, *citrus aurantium* L., sword bean, dried orange peel, and *sterculia lychnophora*, with the above proportions, having undergone purification, cleansing, cutting, and grinding, for subsequent use;

(2) decocting: decocting twice a mixture obtained in step (1) with addition of water, to obtain a Chinese medicine liquid, operations of the twice decocting processes being as follows:

for the first time, adding water of 10 times the weight of the mixture obtained in the step (1), heating them for decocting and extracting the same, wherein timing was started when they were boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing was started when they were boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction;

(3) concentrating: feeding the Chinese medicine liquid obtained in step (2) into a concentrator via a pipeline, to be concentrated into a thick paste, the concentration temperature being 73° C., and the relative density of the resulted thick paste being 1.33 under the temperature condition of 50° C.;

(4) wet granulating:

(4.1) dry blending: putting dextrin, maltodextrin, soluble starch, and aspartame into an efficient mixing granulator to be mixed and stirred for 15 minutes, to obtain a mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time with a 12-mesh screen;

(4.3) drying: putting the sized particles obtained in step (4.2) into a boiling dryer to be dried, the temperature of the materials being kept at 72° C., and the moisture of the final materials being kept at 4.5%;

(4.4) sizing for the second time: performing the second time of sizing by an oscillating machine with a 10-mesh screen;

(4.5) selecting particles: selecting particles with 10-60 meshes;

(5) packaging: bagging mixed qualified particles according to standard operation instructions of an automatic packaging machine, wherein packaging appearance and quantity was detected at any time, and adjustment was made in time in case of abnormalities, closing and storing the packaged particles in a clean container, with a product name, a lot number, quantity, date, etc. being marked for subsequent use, wherein a reference packaging quantity was 8 g per bag, and a packaging quantity limit was 8 g per bag ±5%.

EXAMPLE 5

A solid drink for regulating qi-depression constitution included the following components of raw materials in parts by weight: citron 33 parts, *perilla* 33 parts, finger citron 20 parts, *citrus aurantium* L. 20 parts, sword bean 20 parts, mint 33 parts, spina data seeds 33 parts, malt 33 parts, dried orange peel 20 parts, Chinese olive 33 parts, *sterculia lychnophora* 13 parts, dextrin 40 parts, maltodextrin 30 parts, soluble starch 30 parts, and aspartame 0.2 parts.

A preparing method was as follows:

(1) preparing raw materials: mixing citron, *perilla*, mint, spina data seeds, malt, Chinese olive, finger citron, *citrus aurantium* L., sword bean, dried orange peel, and *sterculia*

*lychnophora*, with the above proportions, having undergone purification, cleansing, cutting, and grinding, for subsequent use;

(2) decocting: decocting twice a mixture obtained in step (1) with addition of water, to obtain a Chinese medicine liquid, operations of the twice decocting processes being as follows:

for the first time, adding water of 10 times the weight of the mixture obtained in the step (1), heating them for decocting and extracting the same, wherein timing was started when they were boiling, and after 1.5 hours of decoction and extraction, immediately feeding the medicine liquid through a pipeline filter by a pump into a stainless steel medicine liquid tank;

for the second time, adding water of 8 times the weight of the mixture obtained in the step (1), heating them for decocting and extracting the same, wherein timing was started when they were boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction;

(3) concentrating: feeding the Chinese medicine liquid obtained in step (2) into a concentrator via a pipeline, to be concentrated into a thick paste, the concentration temperature being 77° C., and the relative density of the resulted thick paste being 1.4 under the temperature condition of 50° C.;

(4) wet granulating:

(4.1) dry blending: putting dextrin, maltodextrin, soluble starch, and aspartame into an efficient mixing granulator to be mixed and stirred for 15 minutes, to obtain a mixed excipient;

(4.2) sizing for the first time: adding the thick paste extracted in step (3) gradually to the mixed excipient, mixing and stirring the thick paste at cutting speed I and stirring speed I to granulate them to obtain a soft material, and sizing the soft material for the first time with a 12-mesh screen;

(4.3) drying: putting the sized particles obtained in step (4.2) into a boiling dryer to be dried, the temperature of the materials being kept at 76° C., and the moisture of the final materials being kept at 3.8%;

(4.4) sizing for the second time: performing the second time of sizing by an oscillating machine with a 10-mesh screen;

(4.5) selecting particles: selecting particles with 10-60 meshes;

(5) packaging: bagging mixed qualified particles according to standard operation instructions of an automatic packaging machine, wherein packaging appearance and quantity was detected at any time, and adjustment was made in time in case of abnormalities, closing and storing the packaged particles in a clean container, with a product name, a lot number, quantity, date, etc. being marked for subsequent use, wherein a reference packaging quantity was 8 g per bag, and a packaging quantity limit was 8 g per bag ±5%.

EXPERIMENT EXAMPLE 1

250 volunteers with the qi-depression constitution were recruited, and equally divided into 5 groups to respectively use the solid drink prepared in Examples 1 to 5 for conducting the treatment experiment. Usage and dosage: 8 g for each time, twice a day, dissolved in 200 ml of boiling water for administration. After one month of drinking, the qi-depression status of their constitution was assessed, and the final treatment effects were evaluated into three types: cured, effective, and failed, among which, "cured" refers to that the qi-depression constitution is significantly improved, and the qi-depression symptoms basically completely disappear; "effective" refers to that the qi-depression constitution is effectively improved, and the qi-depression symptoms partially disappear; "failed" refers to that the qi-depression constitution is basically not improved, and almost none of the qi-depression symptoms disappears. The statistics results of the volunteers evaluated are shown in the following Table 1.

TABLE 1

Treatment Effects of Volunteers with Qi-depression Constitution

| Example | Cured/person | Effective/person | Failed/person | Effective rate/% |
|---|---|---|---|---|
| 1 | 39 | 5 | 6 | 88 |
| 2 | 40 | 7 | 3 | 94 |
| 3 | 46 | 3 | 1 | 98 |
| 4 | 44 | 4 | 2 | 96 |
| 5 | 48 | 2 | 0 | 100 |
| Total | 217 | 21 | 12 | 95.2 |

EXPERIMENT EXAMPLE 2

Sensory Evaluation

The solid drink prepared in Examples 1 to 5 was mixed with boiling water and then taken as test groups, and the mixed medicine liquid after the two times of decoction prepared and obtained in step (2) in the processing process of Example 5 as a control group. Samples of the test groups and the control group were set to have three repetitions. 20 professional sensory evaluators performed the sensory evaluation. The sensory evaluating and scoring standards are shown in Table 2, and the sensory evaluating results are shown in Table 3.

TABLE 2

Sensory Evaluating and Scoring Standards

| Item | Sensory Evaluation | Score |
|---|---|---|
| Color | dark | 1 |
|  | suitable | 5 |
|  | light | 1 |
| Odor | strong Chinese medicine smell | 1 |
|  | slight Chinese medicine smell | 3 |
|  | medicine fragrance | 5 |
|  | relatively light | 3 |
|  | light | 1 |
| Taste | bitter | 1 |
|  | relatively bitter | 3 |
|  | fragrant and sweet | 5 |
|  | relatively sweet | 3 |
|  | too sweet | 1 |
| Smoothness | smooth and lubricated | 5 |
|  | sense of particles | 3 |
|  | sense of scratching throat | 1 |
|  | hard to swallow | 0 |
| Overall Evaluation | bad | — |
|  | ordinary | — |
|  | good | — |

TABLE 3

| | | Control Group | Test Groups | | | | | |
|---|---|---|---|---|---|---|---|---|
| Item | | | Example 1 | Example 2 | Example 3 | Example 4 | Example 5 | Mean |
| Sensory Evaluation (score) | Color | 38 | 90 | 92 | 89 | 90 | 91 | 90.4 |
| | Odor | 20 | 94 | 93 | 94 | 96 | 95 | 94.4 |
| | Taste | 35 | 93 | 94 | 95 | 97 | 94 | 94.6 |
| | Smoothness | 90 | 95 | 94 | 93 | 93 | 95 | 94 |
| | Mean | 45.75 | 93 | 93.25 | 92.75 | 94 | 93.75 | 93.35 |
| Overall Evaluation (number of person) | Good | 7 | 16 | 18 | 19 | 20 | 20 | 18.6 |
| | Ordinary | 3 | 2 | 2 | 1 | 0 | 0 | 1 |
| | Bad | 10 | 2 | 0 | 0 | 0 | 0 | 0.4 |

It can be seen from the above test results that the mean scores of the color, odor, taste, and smoothness of the solid drink prepared in Examples 1 to 5 evaluated by the 20 professional sensory evaluators are higher than the scores of the control group. The results show that the solid drink provided in the present invention is greatly improved in the odor and taste over the medicine liquid obtained after decocting a Chinese medicine decoction piece, moreover, the sweet taste is added, and the taste and the smoothness are both substantially improved, quite suitable for daily drinking.

EXPERIMENT EXAMPLE 3

Animal Toxicity Experiment

1. Animal Acute Toxicity Test of the Solid Drink of the Present Invention

Supply: particles of the solid drink prepared in Examples 1-5 of the present invention.

Acute toxicity: 30 mice of 18-22 g were selected, and were administrated once by gavage according to the dosage of 0.3 g/kg. No mouse died after continual observation of 3 days. Subacute toxicity test was also conducted in the present experiment. Results show that after the administration of the solid drink particles of Example 5 according to the above dosage, no significant abnormality was observed in various examination indexes and pathological tissue sections.

2. Animal Long-term Toxicity Test of the Solid Drink of the Present Invention

Test objective: observe toxic reactions generated by the rats after 3 months of continual administration of the solid particles of the present invention by gavage, so as to ensure usage safety.

Supply: particles of the solid drink prepared in Example 5 of the present invention.

Test animals: Wister rats, half males and half females, with a mean body weight of 100±12.1 g for the males, and a mean body weight of 110±10.93 g for the females.

Test method: the test animals were randomly divided into three groups: a control group; a group of high-dosage 6.0 g/kg of the solid drink; a group of low-dosage 3.0 g/kg of the solid drink. Each group had 20 rats, half males and half females, and the administration by gavage was made according to the dosage every day; the control group was fed with drinking water of the same weight. The administration and feeding were continued for 12 weeks.

The general states of the animals were observed during the administration, and they were weighed every week. On the next day of drug withdrawal, the animals of respective groups were subjected to intraperitoneal injection of 30 mg/kg of pentobarbital sodium to anaesthetize, and blood was taken from the ventral abdominal artery to measure various indexes of the blood; the serum was segregated to conduct liver and kidney function tests. The main internal organs of the rats were taken out and weighed, and the organ coefficient was calculated according to the weights, meanwhile, visual inspection and microscopic pathological examination, etc. were conducted on the same. The remaining half of the animals stopped taking the drug, and were continuously fed for two weeks to observe changes in the recovery phase.

Test Results: (1) general state: the rats of the two dosage groups were normal in activity during the administration, with no significant abnormality in food-intake, water drinking, or defecation, and without death; (2) body weight: the rats of the two dosage groups did not have significant differences in the growth and change of the body weight from the control group during the administration and recovery phase; (3) hematology examination: after 12 weeks of administration of the two dosage groups, all the various indexes measured are within normal ranges, without remarkable difference from the control group; (4) serum biochemical examination: after 12 weeks of continuous administration of the two dosage groups, all the various biochemical indexes are within normal ranges, without remarkable difference from the control group; (5) histological observation: the rats of the two dosage groups and the control group were subjected to autopsy after the end of the administration period, and upon visual observation and tissue section observation, no significant pathological change was observed.

Test conclusion: after 12 weeks of administration of the solid drink particles by gavage for the rats of the two groups—the high-dosage group and the low-dosage group, no growth is observed in the animals' appearance or body weight; the toxicity changes in the hematology, serum biochemistry, and the main internal organs indicate that the solid drink particles of the present invention have no significant toxic effect within the used dosages and administration period.

The foregoing only describes preferred examples of the present invention and is not intended to limit the present invention. For a person skilled in the art, various modifications and variations may be made to the present invention. Any modifications, equivalent replacements, improvements, etc., made within the spirit and principle of the present invention, should be covered by the scope of protection of the present invention.

What is claimed is:

1. A solid drink for regulating qi-depression constitution, comprising the following components of raw materials in parts by weight: citron 20-44 parts, *perilla* 17-45 parts, finger citron 10-38 parts, *citrus aurantium* L. 9-35 parts, sword bean 10-33 parts, mint 20-50 parts, spina data seeds 18-50 parts, malt 24-43 parts, dried orange peel 11-32 parts, Chinese olive 17-45 parts, *sterculia lychnophora* 8-23 parts, dextrin 25-55 parts, maltodextrin 15-45 parts, soluble starch 15-45 parts, and aspartame 0.1-0.3 parts.

2. The solid drink for regulating qi-depression constitution of claim 1, comprising the following components of raw materials in parts by weight: citron 25-40 parts, *perilla* 20-38 parts, finger citron 13-33 parts, *citrus aurantium* L. 12-30 parts, sword bean 15-25 parts, mint 25-43 parts, spina data seeds 23-44 parts, malt 28-39 parts, dried orange peel 14-26 parts, Chinese olive 23-41 parts, *sterculia lychnophora* 10-18 parts, dextrin 30-50 parts, maltodextrin 20-40 parts, soluble starch 20-40 parts, and aspartame 0.15-0.25 parts.

3. The solid drink for regulating qi-depression constitution of claim 1, comprising the following components of raw materials in parts by weight: citron 33 parts, *perilla* 33 parts, finger citron 20 parts, *citrus aurantium* L. 20 parts, sword bean 20 parts, mint 33 parts, spina data seeds 33 parts, malt 33 parts, dried orange peel 20 parts, Chinese olive 33 parts, *sterculia lychnophora* 13 parts, dextrin 40 parts, maltodextrin 30 parts, soluble starch 30 parts, and aspartame 0.2 parts.

4. A method for processing a solid drink for regulating qi-depression constitution, comprising the following steps:
   (1) preparing raw materials: mixing citron, *perilla*, mint, spina data seeds, malt, Chinese olive, finger citron, *citrus aurantium* L., sword bean, dried orange peel, and *sterculia lychnophora* having undergone purification, cleansing, cutting, and grinding, for subsequent use;
   (2) decocting: decocting twice a mixture obtained in step (1) with addition of water, to obtain a Chinese medicine liquid;
   (3) concentrating: feeding the Chinese medicine liquid obtained in step (2) into a concentrator via a pipeline, to be concentrated into a thick paste;
   (4) wet granulating: mixing and stirring dextrin, maltodextrin, soluble starch, and aspartame to obtain a mixed excipient, and adding the thick paste obtained in step (3) to the mixed excipient, then stirring and granulating them.

5. The method for processing a solid drink for regulating qi-depression constitution of claim 4, wherein operations of the twice decocting processes in the step (2) are as follows:
   for the first time, adding water of 10 times the weight of the mixture obtained in the step (1), heating them for decocting and extracting the same, wherein timing is started when they are boiling, and after 1.5 hours of decoction and extraction, immediately feeding a medicine liquid through a pipeline filter by a pump into a stainless steel medicine liquid tank;
   for the second time, adding water of 8 times the weight of the mixture obtained in the step (1), heating them for decocting and extracting the same, wherein timing is started when they are boiling, and after 1.5 hours of decoction and extraction, immediately feeding the medicine liquid through the pipeline filter by the pump into the stainless steel medicine liquid tank, and mixing it evenly with the medicine liquid obtained from the first time of decoction and extraction.

6. The method for processing a solid drink for regulating qi-depression constitution of claim 4, wherein a concentration temperature in the step (3) is 70-80° C., and a relative density of the resulted thick paste is 1.2-1.5 under a temperature condition of 50° C.

7. The method for processing a solid drink for regulating qi-depression constitution of claim 4, wherein the wet granulating in the step (4) comprises the following steps:
   (4.1) dry blending: putting dextrin, maltodextrin, soluble starch, and aspartame into an efficient mixing granulator to be mixed and stirred for 15 minutes, to obtain the mixed excipient;
   (4.2) sizing for the first time: adding the thick paste extracted in step (3) gradually to the mixed excipient, mixing and stirring the thick paste at cutting speed I and stirring speed Ito granulate them to obtain a soft material, and sizing the soft material for the first time;
   (4.3) drying: putting the sized particles obtained in step (4.2) into a boiling dryer to be dried;
   (4.4) sizing for the second time: performing the second time of sizing by an oscillating machine.

8. The method for processing a solid drink for regulating qi-depression constitution of claim 7, wherein a 12-mesh screen is used in the first time of sizing, and a 10-mesh screen is used in the second time of sizing.

9. The method for processing a solid drink for regulating qi-depression constitution of claim 7, wherein in the drying process of step (4.3), a temperature of materials is kept at 70-80° C., and a moisture of final materials is kept below 5%.

10. The method for processing a solid drink for regulating qi-depression constitution of claim 7, wherein a step of selecting particles is further comprised after the second time of sizing, to select particles with 10-60 meshes.

* * * * *